(12) United States Patent
Matin et al.

(10) Patent No.: US 7,754,470 B2
(45) Date of Patent: Jul. 13, 2010

(54) NITROREDUCTASE ENZYMES FOR BIOREMEDIATION

(75) Inventors: A. C. Matin, Stanford, CA (US); Yoram Barak, Menlo Park, CA (US); David F. Ackerley, Wellington (NZ)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 637 days.

(21) Appl. No.: 11/643,199

(22) Filed: Dec. 20, 2006

(65) Prior Publication Data

US 2007/0254355 A1    Nov. 1, 2007

Related U.S. Application Data

(60) Provisional application No. 60/752,517, filed on Dec. 20, 2005.

(51) Int. Cl.
| | |
|---|---|
| *A62D 3/00* | (2007.01) |
| *C12N 9/02* | (2006.01) |
| *C12N 9/00* | (2006.01) |
| *C12Q 1/26* | (2006.01) |
| *C12P 21/06* | (2006.01) |
| *C12N 1/20* | (2006.01) |
| *C07H 21/04* | (2006.01) |

(52) U.S. Cl. .................... 435/262.5; 435/189; 435/183; 435/25; 435/69.1; 435/252.3; 536/23.2; 536/23.7

(58) Field of Classification Search ........................ None
See application file for complete search history.

(56) References Cited

OTHER PUBLICATIONS

Broun et al., Catalytic plasticity of fatty acid modification enzymes underlying chemical diversity of plant lipids. Science, 1998, vol. 282: 1315-1317.*
Kisselev L., Polypeptide release factors in prokaryotes and eukaryotes: same function, different structure. Structure, 2002, vol. 10: 8-9.*
Wishart et al., A single mutation converts a novel phosphotyrosine binding domain into a dual-specificity phosphatase. J. Biol. Chem., 1995, vol. 270(45): 26782-26785.*
Witkowski et al., Conversion of b-ketoacyl synthase to a Malonyl Decarboxylase by replacement of the active cysteine with glutamine. Biochemistry, 1999, vol. 38: 11643-11650.*
Ackerley et al., "Chromate-reducing properties of soluble flavoproteins from *Pseudomonas putida* and *Escherichia coli*", Appl. Environ. Microbiol., 2004, 70(2):873-882.
Barak et al., Poster A33: Improvement of a Novel Enzyme, Using Directed Evolution, for Reductive Cancer Chemotherapy, European Organization for Research and Treatment of Cancer "Molecular targets and Cancer Therapeutics" Conference, Philadelphia, PA, Nov. 14-18, 2005.
Barak et al., "Analysis of novel soluble chromate and uranyl reductases and generation of an improved enzyme by directed evolution", Appl. Environ. Microbiol., 2006, 72(11):7074-7082.
Park et al., "Purification to homogeneity and characterization of a novel *Pseudomonas putida* chromate reductase", Appl. Environ. Microbiol., May 2000, 66(5):1788-1795.

* cited by examiner

*Primary Examiner*—Ganapathirama Raghu
(74) *Attorney, Agent, or Firm*—Bozicevic, Field & Francis LLP; Pamela J. Sherwood (57) ABSTRACT

Compositions and methods are provided for bioremediation of toxic metals.

11 Claims, 7 Drawing Sheets

NITROREDUCTASE ENZYMES FOR BIOREMEDIATION

CROSS-REFERENCE TO RELATED APPLICATIONS

This application claims the benefit of U.S. Provisional Application No. 60/752,517, filed Dec. 20, 2005, which application is incorporated herein by reference.

This invention was made with Government support under contract DE-FG02-03ER63627 awarded by the U.S. Department of Energy. The Government has certain rights in this invention.

BACKGROUND OF THE INVENTION

Bioremediation, the use of microorganisms to detoxify hazardous contaminants, has long been considered a promising method to provide economical and ecologically sound clean-up strategies. The U.S. Environmental Protection Agency (EPA) has classified bioremediation as one of the most promising and potentially economical innovative treatment technologies. Three major considerations in selection of the most appropriate strategy to implement bioremediation at a specific site include the amenability of the pollutant to biotransformation to less toxic products, the accessibility of the pollutant to microorganisms, and the optimization of biological activity. For metal contaminants that cannot be chemically degraded, microbial systems can biotransform toxic metal species to ones that are less toxic, immobilized, or are easier to recover.

Bioremediation can utilize naturally occurring microorganisms, or enhancing microbial organisms to better effect the desired detoxification process. In the latter method, intrinsic microbial activities are increased through various methods, including physiologically augmenting the capabilities of indigenous microbial consortia, enhancing indigenous consortia by supplementing with more robust microorganisms with a higher bioactivity for the contaminant, biotransforming or binding metals; manipulating the environment, for example with air sparging to maintain an aerobic environment, and other means to increase the desired metabolic degradation of organics, or the immobilization, detoxification, or binding of metals.

As bioremediation relies on microorganisms, microorganisms with biochemical and physiological characteristics suitable for the task must be identified or created. Microorganisms for bioremediation applications may be identified by isolating strains or consortia from sites that have been heavily contaminated with a given pollutant. The microbial population isolated from the contaminated site can be enriched for degraders of the given pollutant in enrichment cultures. Alternatively, strains or consortia isolated from contaminated sites or from laboratory culture collections can be screened for the desired bioremediation trait. Various methods have been developed for screening such microorganisms.

In many cases, naturally occurring organisms are not optimized for the desired bioremediation activity. For such organisms, it may be desirable to modify the inherent genetic capability in order to enhance a characteristic of interest.

Techniques are required for removing dissolved uranium from a variety of surface waters, groundwaters, and waste streams in order to prevent or remediate environmental pollution. For example, several steps in the mining and processing of uranium either generate uranium-bearing waste streams or have the potential for contaminating natural waters. Furthermore, the nuclear weapons production program in the US and elsewhere has resulted in large scale contamination of soils, sediments and waters by uranium. At the US Department of Energy waste sites, this contamination is estimated to cost billions of dollars for cleanup. The remediation of uranium-contaminated soils is likely to generate large volumes of uranium-bearing leachate. Irrigation practices may result in surface waters or groundwaters with elevated levels of uranium.

Ion-exchange resins are commonly used to remove uranium from water. However, the desirability of ion-exchange methods can be limited by the material costs, interferences by competing ions, poor extraction at low uranium concentrations, and the production of a large volume of waste when the exchange resin is disposed or the generation of a highly corrosive uranium-containing waste if the uranium is extracted from the resin. Thus, there has been interest in developing alternative mechanisms for uranium removal.

The potential for bioprocessing of uranium and other radioactive wastes and ores is receiving increased attention because microbially based processes may provide cost effective mechanisms for metal removal. Several biological methods for extracting dissolved uranium have been developed.

The finding that several microorganisms can enzymatically reduce U(VI) to U(IV) has suggested an alternative enzymatic process for removing dissolved uranium from water. Dissolved uranium is typically in the oxidized form, U(VI), which is highly soluble. In contrast, the reduced form, U(IV), is highly insoluble in most waters. Microbial U(VI) reduction converts dissolved U(VI) to an extracellular precipitate of the mineral uraninite ($UO_2$). This reductive precipitation of uranium has been proposed to account for the accumulation of uranium in various anaerobic environments such as aquatic sediments, roll-front ore deposits, and reduction spots. The ability of microbial U(VI) reduction to precipitate U(IV) from U(VI)-amended groundwater suggested that this metabolism might be used to remove U(VI) from contaminated waters.

Cr(VI) compounds, primarily in the forms of chromate ($CrO_4^{2-}$) and dichromate ($Cr_2O_7^{2-}$) are common environment pollutants in soils and water. These compounds have become widely distributed in the environment from their use in a variety of commercial processes, such as rust proofing, metal plating, and manufacture of dyes and inks, as well as chromite ore processing. As a result of contaminated discharges from these industrial applications and inappropriate waste disposal practices, significant amounts of chromate and dichromate have contaminated the environment. Furthermore, the nuclear weapons production program in the US and elsewhere has resulted in large scale contamination of soils, sediments and waters by chromate. At the US Department of Energy waste sites, this contamination is estimated to cost billions of dollars for cleanup. As an environmental pollutant, Cr(VI) represents a considerable health risk.

Improved compositions and methods for bioremediation of toxic metals, including uranyl and chromate are of great interest. The present invention addresses these issues.

Relevant Literature

European Organization for Research and Treatment of Cancer "Molecular Targets and Cancer Therapeutics" Conference, Philadelphia, Pa. Nov. 14-18 2005. Poster A33: Improvement of a Novel Enzyme, Using Directed Evolution, for Reductive Cancer Chemotherapy, Barak et al. Analysis of novel soluble chromate and uranyl reductases and generation of an improved enzyme using directed evolution, Barak et al.

SUMMARY OF THE INVENTION

Methods are provided for monitoring and enhancing the biotransformation of toxic metals, including uranium and chromium, which may be present in combination with each other and with other metals and contaminants. This invention has direct application to both the in situ and ex situ bioremediation of contaminated soil, sediment and ground water. Microorganisms for bioremediation by the methods of the present invention comprise genetic sequences encoding the *E. coli* nitroreductase enzyme ChrR (formerly called YieF), usually a non-native ChrR, and more usually a non-native ChrR having enhanced enzyme kinetics for reduction of metals, relative to the wild-type *E. coli* enzyme. Microorganisms, e.g. bacterial cells, expressing such improved non-native ChrR enzymes catalyze the one step reduction of Cr(VI) to Cr(III); and/or U(VI) to U(IV).

In some embodiments of the invention, cells comprising non-native ChrR coding sequences are provided, which non-native coding sequences encode an enzyme having improved kinetics for reduction of metals. The cells may be intact or permeabilized. The non-native sequences may be present in the genome of the organism, or in a vector that provides for expression of the ChrR enzyme. Vectors of interest include plasmids, viruses capable of expression in bacterial cells, and the like.

Most polluted sites contain mixed waste, for example a complex mixture of heavy metals, radionuclides, and organic solvents. In such environments enzymes that can remediate multiple pollutants are advantageous. ChrR was altered to provide a non-native enzyme with markedly enhanced capacity for remediating the contaminants chromate and uranyl. ChrR is a soluble enzyme and reduces chromate and uranyl intracellularly. Thus, the reduced product is at least partially sequestered and nucleated, minimizing the chances of reoxidation. Further, ChrR6 makes bacteria, e.g. *Pseudomonas putida* and *Escherichia coli*, more efficient agents for bioremediation.

BRIEF DESCRIPTION OF THE DRAWINGS

These and other objects, features and many of the attendant advantages of the invention will be better understood upon a reading of the detailed description of the invention when considered in connection with the accompanying drawings which show as follows.

DETAILED DESCRIPTION OF THE EMBODIMENTS

Methods are provided for bioremediation, the methods comprising contacting a contaminated composition, e.g. soil, water, etc. with microorganisms over-expressing the nitroreductase enzyme ChrR (YieF), usually a non-native ChrR, and more usually a non-native ChrR having enhanced enzyme kinetics for reduction of toxic metals, relative to the wild-type *E. coli* enzyme. Such microorganisms catalyze a one step reduction of Cr(VI) to Cr(III); and/or U(VI) to U(IV).

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned hereunder are incorporated herein by reference. Unless mentioned otherwise, the techniques employed herein are standard methodologies well known to one of ordinary skill in the art.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

The practice of the present invention will employ, unless otherwise indicated, conventional techniques of molecular biology (including recombinant techniques), microbiology, cell biology, biochemistry and immunology, which are within the skill of the art. Such techniques are explained fully in the literature, such as, "Molecular Cloning: A Laboratory Manual", second edition (Sambrook et al., 1989); "Oligonucleotide Synthesis" (M. J. Gait, ed., 1984); "Animal Cell Culture" (R. I. Freshney, ed., 1987); "Methods in Enzymology" (Academic Press, Inc.); "Handbook of Experimental Immunology" (D. M. Weir & C. C. Blackwell, eds.); "Gene Transfer Vectors for Mammalian Cells" (J. M. Miller & M. P. Calos, eds., 1987); "Current Protocols in Molecular Biology" (F. M. Ausubel et al., eds., 1987); "PCR: The Polymerase Chain Reaction", (Mullis et al., eds., 1994); and "Current Protocols in Immunology" (J. E. Coligan et al., eds., 1991).

The term "gene" is well understood in the art and includes polynucleotides encoding a polypeptide. In addition to the polypeptide coding regions, a gene may includes non-coding regions including, but not limited to, introns, transcribed but untranslated segments, and regulatory elements upstream and downstream of the coding segments.

The terms "polypeptide", "peptide" and "protein" are used interchangeably to refer to polymers of amino acids of any length. These terms also include proteins that are post-translationally modified through reactions that include glycosylation, acetylation and phosphorylation.

An "effective amount" is an amount sufficient to effect beneficial or desired results. An effective amount can be administered in one or more administrations.

As used herein, "treatment" is an approach for obtaining beneficial or desired results.

ChrR Polypeptides

For use in the subject methods, the native ChrR protein from *E. coli*; homologs from related bacteria; variants derived therefrom; or a combination thereof may be used. The sequence of native *E. coli* ChrR is as follows: (SEQ ID NO:1) MSEKLQVVTL LGSLRKGSFN GMVARTLPKI APAS-MEVNAL PSIADIPLYD ADVQQEDGF PATVEALAEQI RQADGVVIVT PEYNYSVPGG LKNAIDWLSR LPDQ-PLAGKP VLIQTSSMGV IGGARCQYHL RQILVFLDAM VMNKPEFMGG VIQNKVDPQT GEVIDQSTLD HLT-GQLTAFG EFIQRVKI. The sequence is available at Genbank, accession number AF385329.

Homologs of ChrR are known in the art, e.g. from such bacterium as *Shigella boydii; Salmonella enterica; Shigella flexneri; Salmonella typhimurium; Pseudomonas aeruginosa; Streptomyces coelicolor; Bacillus subtilis; Lactococcus lactis*, etc. Such homologs usually have at least about 35% amino acid identity with SEQ ID NO:1, more usually at least about 45% sequence identity; and may be at least about 80% sequence identity; at least about 85%, at least about 90%, or more. In some embodiments a fragment of a ChrR peptide may be utilized. Peptides of interest include fragments of at least about 50 contiguous amino acids, more usually at least about 100 contiguous amino acids, and may comprise 150 or more amino acids, up to the full length polypeptide. Fragments also included truncated forms of the polypeptide, where deletions may be from about 1 to about 5, to about 10, to about 15, to about 20, to about 25 amino acids, and may extend from residue 1 through 25 at either terminus of the polypeptide, comprising deletions of any length within the region; or may be at an internal location.

The sequence of the ChrR polypeptide may be altered in various ways known in the art to generate changes in sequence. The polypeptide will usually be substantially similar to the sequences provided herein, i.e. will differ by at least one amino acid, and may differ by at least two but not more than about ten amino acids. Where changes are introduced by shuffling, or any other mean of random mutation method, the amino acid differences may be greater. The sequence changes may be substitutions, insertions or deletions. Scanning mutations that systematically introduce alanine, or other residues, may be used to determine key amino acids.

In one embodiment of the invention, the polypeptide comprises an amino acid substitution at the position corresponding to amino acid 128 of SEQ ID NO:1. It will be understood by one of skill in the art that the corresponding amino acid can be determined in homologous polypeptides by alignment of the two sequences using conventional algorithms, e.g. BLASTN, CLUSTALW, and the like.

The native *E. coli* polypeptide contains a tyrosine at position 128, and substitutions of interest include an amino acid other than tyrosine at position 128. Substitutions of interest at this position include asn (asparagine), and amino acids that are conservative with respect to asn, including gln (glutamine). Other residues that commonly substitute for asparagine in homologous proteins include asp (aspartic acid); his (histidine); ser (serine); gly (glycine); lys (lysine); arg (arginine); glu (glutamine) and thr (threonine). A polypeptide with a tyr1284 28asn substitution may be referred to as ChrR21.

In other embodiments of the invention, the polypeptide comprising an amino acid substitution at the position corresponding to amino acid 128 of SEQ ID NO:1 further comprises an amino acid substitution at the position corresponding to amino acid 150 of SEQ ID NO:1, where the substituted amino acid is other than glycine. Substitutions of interest include serine and amino acids that are conservative with respect to serine, including threonine, cysteine, and the like.

In other embodiments of the invention, the polypeptide comprising an amino acid substitution at the position corresponding to amino acid 128 of SEQ ID NO:1 may further comprise an amino acid substitution at the position corresponding to amino acid 154 of SEQ ID NO:1, where the substituted amino acid is other than asparagine. Substitutions of interest include threonine and amino acids that are conservative with respect to threonine, including serine, cysteine, and the like.

Modifications of interest that do not alter primary sequence, and which may be applied to the native sequence or to derivatives thereof include chemical derivatization of polypeptides, e.g., pegylation, acylation, acetylation, carboxylation, etc. Also included in the subject invention are polypeptides that have been modified using ordinary molecular biological techniques and synthetic chemistry so as to improve their resistance to proteolytic degradation or to optimize solubility properties or to render them more suitable as a therapeutic agent. For examples, the backbone of the peptide may be cyclized to enhance stability (see Friedler et al. (2000) J. Biol. Chem. 275:23783-23789). Analogs of such polypeptides include those containing residues other than naturally occurring L-amino acids, e.g. D-amino acids or non-naturally occurring synthetic amino acids.

The subject peptides may be prepared by in vitro synthesis, using conventional methods as known in the art, or expressed from a polynucleotide construct. The particular sequence and the manner of preparation will be determined by convenience, economics, purity required, and the like.

The polypeptides may also be isolated and purified in accordance with conventional methods of recombinant synthesis. A lysate may be prepared of the expression host and the lysate purified using HPLC, exclusion chromatography, gel electrophoresis, affinity chromatography, or other purification technique. For the most part, the compositions which are used will comprise at least 20% by weight of the desired product, more usually at least about 75% by weight, preferably at least about 95% by weight, and for therapeutic purposes, usually at least about 99.5% by weight, in relation to contaminants related to the method of preparation of the product and its purification. Usually, the percentages will be based upon total protein.

The enzyme can be screened indirectly for Cr(VI) reduction. For example the calorimetric diphenyl carbazide assay of Greenberg et al (Greenberg, A. E., J. J. Connors, D. Jenkins, and M. A. Franson (ed.). 1981. Standard methods for the examination of water and wastewater, 15th ed., p.187-190. American Public Health Association, Washington, D.C.) has been used. Alternatively the end product of chromate reduction can be determined using the X-ray absorption near-edge structure (XANES) spectrum. In this method, Cr(VI) and Cr(III) can be distinguished by the pronounced pre edge feature of the former. The fraction of Cr(VI) was calculated by dividing the height of the Cr(VI) pre edge peak by the total absorption; that of Cr(III) was calculated from the difference between the amount of chromium represented by the pre edge peak and the total absorption jump.

ChrR Nucleic Acids

The invention includes nucleic acids that encode the sequence set forth in SEQ ID NO:1 and variants or homologs thereof, particularly variants or homologs encoding an amino acid substitution at position 128; position 150; and/or position 154, as described above; nucleic acids that hybridize under stringent conditions, particularly conditions of high stringency, to the sequences that encode the sequence set forth in SEQ ID NO:1; and fragments and derivatives thereof. For example, the native sequence encoding SEQ ID NO:1 may be accessed at GenBank, accession no. NC_000913.2. One of skill in the art will readily appreciate that the redundancy of the genetic code allows many silent changes to be made in the coding sequence. Other nucleic acid compositions contemplated by and within the scope of the present invention will be readily apparent to one of ordinary skill in the art when provided with the disclosure here.

The nucleic acids of the invention include nucleic acids having sequence similarity or sequence identity to sequences that encode the sequence set forth in SEQ ID NO:1. Nucleic acids having sequence similarity are detected by hybridization under low stringency conditions, for example, at 50° C. and 10×SSC (0.9 M saline/0.09 M sodium citrate) and remain bound when subjected to washing at 55° C. in 1×SSC. Sequence identity can be determined by hybridization under stringent conditions, for example, at 50° C. or higher and 0.1×SSC (9 mM saline/0.9 mM sodium citrate). Hybridization methods and conditions are well known in the art, see, e.g., U.S. Pat. No. 5,707,829. Nucleic acids that are substantially identical to the provided nucleic acid sequence, e.g. allelic variants, homologs, genetically altered versions of the gene, etc., bind to sequences that encode the sequence set forth in SEQ ID NO:1 under stringent hybridization conditions. By using probes, particularly labeled probes of DNA sequences, one can isolate homologous or related genes. The source of homologous genes can be any species, e.g. primate species, particularly human; rodents, such as rats and mice; canines, felines, bovines, ovines, equines, fish, yeast, nematodes, etc.

Nucleic acids of the invention also include naturally occurring variants of the nucleotide sequences (e.g., degenerate variants, allelic variants, etc.). Variants of the nucleic acids of the invention are identified by hybridization of putative variants with nucleotide sequences disclosed herein, preferably by hybridization under stringent conditions. For example, by using appropriate wash conditions, variants of the nucleic acids of the invention can be identified where the allelic variant exhibits at most about 25-30% base pair (bp) mismatches relative to the selected nucleic acid probe. In general, allelic variants contain 15-25% bp mismatches, and can contain as little as even 5-15%, or 2-5%, or 1-2% bp mismatches, as well as a single bp mismatch.

The invention also encompasses homologs corresponding to the sequences that encode the sequence set forth in SEQ ID NO:1, where the source of homologous genes can be any species, particularly bacterial species, e.g. gram negative bacteria, particularly *Enterobacteriaceae*.

A genomic sequence of interest comprises the nucleic acid present between the initiation codon and the stop codon. It can further include the 3' and 5' untranslated regions found in the mature mRNA. It can further include specific transcriptional and translational regulatory sequences, such as promoters, enhancers, etc., including about 1 kb, but possibly more, of flanking genomic DNA at either the 5' and 3' end of the transcribed region. The nucleic acid compositions of the subject invention can encode all or a part of the subject polypeptides. Double or single stranded fragments can be obtained from the DNA sequence by chemically synthesizing oligonucleotides in accordance with conventional methods, by restriction enzyme digestion, by PCR amplification, etc. Isolated nucleic acids and nucleic acid fragments of the invention comprise at least about 18, about 50, about 100, to about 500 contiguous nt selected from the nucleic acid sequence.

The nucleic acids of the subject invention are isolated and obtained in substantial purity, generally as other than an intact chromosome. Usually, the nucleic acids, either as DNA or RNA, will be obtained substantially free of other naturally-occurring nucleic acid sequences, generally being at least about 50%, usually at least about 90% pure and are typically "recombinant," e.g., flanked by one or more nucleotides with which it is not normally associated on a naturally occurring chromosome.

The nucleic acids of the invention can be provided as a linear molecule or within a circular molecule, and can be provided within autonomously replicating molecules (vectors) or within molecules without replication sequences. Expression of the nucleic acids can be regulated by their own or by other regulatory sequences known in the art. The nucleic acids of the invention can be introduced into suitable host cells using a variety of techniques available in the art, such as transferrin polycation-mediated DNA transfer, transfection with naked or encapsulated nucleic acids, liposome-mediated DNA transfer, intracellular transportation of DNA-coated latex beads, protoplast fusion, viral infection, electroporation, gene gun, calcium phosphate-mediated transfection, and the like.

Expression Constructs

In the present methods, ChrR coding sequences are introduced in a microbial cell for bioremediation. The DNA encoding a ChrR polypeptide may be obtained from any library prepared from suitable cells, prepared from various sources according to the desired ChrR. The ChrR polypeptide-encoding gene may also be obtained by oligonucleotide synthesis. As described above, there are many ChrR-related polypeptides and genetic sequences known in the art. Libraries may be screened with probes (such as antibodies to the ChrR polypeptide, or oligonucleotides of about 20-80 bases) designed to identify the gene of interest or the protein encoded by it. Screening the cDNA or genomic library with the selected probe may be conducted using standard procedures as described in Sambrook et al, Molecular Cloning: A Laboratory Manual (New York: Cold Spring Harbor Laboratory Press, 1989). An alternative means to isolate the gene encoding ChrR polypeptide is to use PCR methodology.

The nucleic acid encoding a ChrR polypeptide may be inserted into a replicable vector for expression. Many such vectors are available. The vector components generally include, but are not limited to, one or more of the following: an origin of replication, one or more marker genes, an enhancer element, a promoter, and a transcription termination sequence. In some embodiments, for example in the utilization of bacterial delivery agents such as *Salmonella*, the ChrR gene is integrated into the host cell chromosome.

ChrR polypeptides may be produced recombinantly not only directly, but also as a fusion polypeptide with a heterologous polypeptide, e.g. a signal sequence or other polypeptide having a specific cleavage site at the N-terminus of the mature protein or polypeptide. The heterologous signal sequence selected preferably is one that is recognized and processed (i.e., cleaved by a signal peptidase) by the host cell.

Expression vectors usually contain a selection gene, also termed a selectable marker. This gene encodes a protein necessary for the survival or growth of transformed host cells grown in a selective culture medium. Host cells not transformed with the vector containing the selection gene will not survive in the culture medium. Typical selection genes encode proteins that (a) confer resistance to antibiotics or other toxins, e.g., ampicillin, neomycin, methotrexate, or tetracycline, (b) complement auxotrophic deficiencies, or (c) supply critical nutrients not available from complex media.

Expression vectors will contain a promoter that is recognized by the host organism and is operably linked to the ChrR coding sequence. Promoters are untranslated sequences located upstream (5') to the start codon of a structural gene (generally within about 100 to 1000 bp) that control the transcription of particular nucleic acid sequence to which they are operably linked. In bacterial cells, the region controlling overall regulation can be referred to as the operator. Promoters typically fall into two classes, inducible and constitutive. Inducible promoters are promoters that initiate increased levels of transcription from DNA under their control in response to some change in culture conditions, e.g., the presence or absence of a nutrient or a change in temperature. A large number of promoters recognized by a variety of potential host cells are well known. Both a native ChrR polypeptide promoter sequence and many heterologous promoters may be used to direct expression of a ChrR polypeptide. However, heterologous promoters are preferred, as they generally permit greater transcription and higher yields.

Promoters suitable for use with prokaryotic hosts include the β-lactamase and β-galactosidase promoter systems, alkaline phosphatase, a tryptophan (trp) promoter systems, hybrid promoters such as the tac promoter, and starvation promoters (Matin, A. (1994) Recombinant DNA Technology II, Annals of New York Academy of Sciences, 722:277-291). However, other known bacterial promoters are also suitable. Such nucleotide sequences have been published, thereby enabling a skilled worker operably to ligate them to a DNA coding sequence. Promoters for use in bacterial systems also will contain a Shine-Dalgarno (S.D.) sequence operably linked to the coding sequence.

Construction of suitable vectors containing one or more of the above-listed components employs standard ligation techniques. Isolated plasmids or DNA fragments are cleaved, tailored, and relegated in the form desired to generate the plasmids required. For analysis to confirm correct sequences in plasmids constructed, the ligation mixtures are used to transform host cells, and successful transformants selected by ampicillin or tetracycline resistance where appropriate. Plasmids from the transformants are prepared, analyzed by restriction endonuclease digestion, and/or sequenced.

Numerous techniques are known and are useful according to the invention for delivering vectors or other polynucleotides described herein to cells, including the use of nucleic acid condensing agents, electroporation, complexing with asbestos, polybrene, DEAE cellulose, Dextran, liposomes, cationic liposomes, lipopolyamines, polyornithine, particle bombardment and direct microinjection (reviewed by Kucherlapati and Skoultchi, 1984; Keown et al., 1990; Weir, 1999; Nishikawa and Huang, 2001).

Microorganisms

Compositions are provided of an isolated microorganism that is capable of reducing chromium and/or uranium in a metabolic reaction. Such an organism is typically a host cell transfected with the isolated polynucleotide or vector comprising such a polynucleotide of the present invention. The host cell may be a bacterial cell, e.g. any one of the microbial cells as follows.

Suitable cells for expressing the DNA in the vectors herein are typically microbial cells. Suitable prokaryotes for this purpose include eubacteria, such as Gram-negative or Gram-positive organisms, for example, *Enterobacteriaceae* such as *Escherichia*, e.g., *E. coli*, *Enterobacter, Erwinia, Klebsiella, Proteus, Salmonella*, e.g., *Salmonella typhimurium, S. enteritica; Serratia*, e.g., *Serratia marcescans*, and *Shigella*, as well as *Bacilli* such as *B. subtilis* and *B. licheniformis*, *Pseudomonads* such as *P. aeruginosa, P. putida*, and *Streptomyces*. Prokaryotes of interest also include nitrate reducing bacteria, e.g. *Shewanella, Desulfovibrio*, e.g. *Desulfovibrio desulfuricans; Geobacter metallireducens, Pseudomonas stutzeri* and *Paracoccus denitriricans*. These examples are illustrative rather than limiting.

For the purposes of the present invention, an isolated microbial strain is one that has undergone some degree of purification from its natural environment. A culture of a microbe considered to be biologically pure will comprise at least about 50% of the microbe as the desired strain, usually at least about 75%, more usually at least about 90%, and may be substantially all of the organisms present in the culture.

The microbial strain of the present invention may also be combined with other species of bacteria, nutrients, and/or other components to provide a composition for bioremediation of metal contaminated sites; and the like. It may be desirable, for example to combine the microbes of the present invention with bacteria capable of removing other pollutants or undesirable compounds from such contaminated sites.

Bioremediation

In situ bioremediation of contaminated soil, sediments or water is generally performed by first identifying the contaminated region to be treated by sinking observation wells in a grid pattern covering the region and taking water samples from the wells or collecting soil samples in a grid pattern covering the region. The sample containing one or more environmental contaminants can include soil, sediment, sludge, water, or combinations thereof, and the bioremediation method can be carried out in situ.

Analysis is conducted on these samples to determine the concentration of metals and type of metals at the various locations in the contaminated region. Next, as described above, the site is monitored for the presence of, and if necessary to provide, metal reducing organisms. This may be accomplished by sprinkling or spraying a liquid solution comprising the organisms on the surface of the contaminated region and allowing the liquid to permeate through the region. Alternatively, injection wells or other forms of conduits may be utilized. If the sample is in a subsurface environment, such as groundwater, the contacting step can include injecting a liquid into the subsurface environment using, for example, drive-point devices. Alternatively, recirculation wells can be used.

Suitable organisms for biomediation comprise the ability to reduce Cr(VI) to Cr(III); and/or U(VI) to U(IV), e.g. organisms comprising a ChrR reductase coding sequence as set forth herein; organisms genetically modified to comprise a ChrR reductase coding sequence as set forth herein; and the like. The organisms may be provided as an isolate; or as a consortium of organisms. If desired, nutrients, such as phosphorus- and nitrogen-containing compounds, can be provided to the sample containing the contaminants to support microbial activity. Such nutrients can be added to the sample as separate compounds or they can be engineered into the compound having at least one hydrolysable organic group.

This invention is also suitable for anaerobic bioremediation by anaerobic bacteria, for example in an above ground bioreactor. Contaminated soil can also be excavated and placed in a bioreactor. Above ground or ex situ bioremediation of aquifers frequently involves "pump and treat" operations which process and treat large volumes of contaminated ground water by use of one or more bioreactors. Generally, ex situ bioremediation of soil or water is performed by transferring the soil or water, or combinations thereof, to a bioreactor treatment process where a significant degree, if not all, of the biotransformation occurs. The organism is added to a bioreactor or upstream thereof. The amount of the organism which is added is preferably an amount that is effective to enhance biotransformation of the halogenated contaminant.

The bioremediation method can be monitored by measuring the initial concentration of a contaminant and monitoring its degradation into transformation products. This latter step can be accomplished by measuring the decrease in concentration of the contaminant of interest and/or the increase in concentration or partial pressure of its transformation products during the degradation of the environmental contaminant.

The transformation products typically include less hazardous, preferably innocuous, compounds and ions, for example less soluble forms of uranium.

In another embodiment, the present invention provides a bioremediation method of reducing Cr(VI) to Cr(III); and/or U(VI) to U(IV), in an environmental sample. The method includes: determining the presence of Cr(VI) and/or U(VI); and contacting the environmental sample with at least one microorganism expressing a ChrR coding sequence of the present invention.

The present invention provides bioremediation methods and kits for treating environmental contaminants in a sample of soil, sediment, sludge, water, or combinations thereof. For example, the sample containing an environmental contaminant can include subsurface water or soil, which can be treated either in situ or ex situ. A contaminated sample typically includes one or more types of microorganisms that reduce the contaminants at least partially. The methods of the invention provide a means of determining whether the reduction will proceed to completion. If such a capability is absent, such microorganisms can be added to the sample.

Although this invention has been described primarily in terms of the biotransformation of Cr(VI) to Cr(III); and/or U(VI) to U(IV), it is clearly envisaged that the organisms; genetic sequences and polypeptides of this invention may also be useful for biotransforming other metals.

EXPERIMENTAL

Material and Methods

Strains, plasmids, genes, primers, and growth conditions. Table 1 shows the strains, plasmids, and primers used in this study. The various *E. coli* and *Salmonella* strains overexpressing the wild-type *E. coli* chrR gene and strains overexpressing the chrR6 gene (which produce the *E. coli* ChrR enzyme and its evolved version, ChrR6, respectively), as well as the control strain (*E coli* containing the empty pET28a$^+$ vector), were grown aerobically in a 37° C. incubator at 225 rpm to the mid-exponential phase, were induced with 0.5 mM isopropyl-β-D-thiogalactopyranoside (IPTG), and were incubated overnight. *Pseudomonas putida* KT2440 and the isogenic CRK4 mutant (Table 3) over-expressing the *E. coli* chrR or chrR6 gene were grown at 18° C. to avoid inclusion body formation following IPTG induction; CRK4 lacks the *P. putida* chrR gene and has a decreased capacity to reduce chromate.

TABLE 1

Bacterial strains, plasmids, and primers

| Strain, plasmid, or primer | Relevant characteristics or sequence |
|---|---|
| *E. coli* strains | |
| BL21 | DE3 allowing overexpression of desired protein under IPTG-inducible T7 promoter |
| MC4100 | F⁻ araD139 Δ(argF-lac)U169 rpsL150 relA1 flbB5301 deoC1 ptsF25 rbsR |
| NR698 | MC4100 imp4213 |

TABLE 1-continued

Bacterial strains, plasmids, and primers

| Strain, plasmid, or primer | Relevant characteristics or sequence |
|---|---|
| *Pseudomonas* strains | |
| KT2440 | Wild-type genome-sequenced strain |
| chrR mutant (CRK4) | Isogenic with wild-type KT2440 but lacking the chromate reductase gene chrR |
| CRK4/*E. coli* chrR | *E. coli* ChrR (GenBank accession no. NC_000913.2 [new no., DQ989184]) overexpression strain; CRK4 containing plasmid pMMB::*E. coli* chrR |
| CRK4 chrR6 | ChrR6 overexpression strain; CRK4 containing plasmid pMMB::chrR6 (GenBank accession no. DQ987901) |
| *Salmonella* strains | |
| *S. enterica* serovar *Typhimurium* SL 7838 | Attenuated strain containing aroA and sopE gene deletions |
| SL 7838/*E. coli* chrR | *E. coli* ChrR overexpression strain; SL 7838 containing plasmid pET28a$^+$::*E. coli* chrR |
| SL 7838/chrR6 | ChrR6 overexpression strain; SL 7838 containing plasmid pET28a$^+$::*E. coli* chrR |
| Plasmids | |
| pET28a$^+$ | Overexpression vector |
| pET28a$^+$::*E. coli* chrR | Allows *E. coli* ChrR overexpression |
| pET28a$^+$::*P. putida* chrR | Allows *P. putida* KT2440 ChrR (GenBank accession no. AF375642.1) overexpression in *E. coli* |
| pET28a$^+$::nfsA | Allows *E. coli* NfsA (GenBank accession no. P17117) overexpression |
| pMMB67EH | Broad-host-range tac expression vector |
| pMMB67EH::*E. coli* chrR | pMMB67EH with BamHI/HindIII His-tagged *E. coli* chrR insert |
| pMMB67EH::chrR6 | pMMB67EH with BamHI/HindIII His-tagged chrR6 insert |
| Primers | |
| F*E. coli* chrR | 5'-CGCGGGGGCATATGTCTGAAAAATTGCAGGT-3' |
| R*E. coli* chrR | 5'-TTTGGGATCCTTAGATCTTAACTCGCTGAA-3' |
| FA120N | 5'-GTATTGATTCAGACCAGCTCAATGGGCGTGATTGG-3' |
| RA120N | 5'-CCAATCACGCCCATTGAGCTGGTCTGAATCAATAC-3' |
| FN128Y | 5'-TTGGCGGCGCGCGCTGTCAGTATCACCTGCGCCAGA-3' |
| RN128Y | 5'-TCTGGCGCAGGTGATACTGACAGCGCGCGCCGCCAAT-3' |
| FN160T | 5'-GTTGATCCGCAAACCGGAGAAGTGATTGA-3' |
| RN160T | 5'-ATCAATCACTTCTCCGGTTTGCGGATCAAC-3' |
| RL175G | 5'-TTAACTCGCTGAATAAACTCACCAAATGCGGTCAATTGCCCGGTCAGGTG-3' |

DNA techniques. Small-scale isolation of plasmid DNA from *E. coli* was carried out by using the miniprep procedure (QIAGEN Inc., California). Plasmids were transformed into *E. coli* BL21(DE3) cells (Invitrogen Inc.) and used for protein production. DNA sequencing was conducted by SEQUETECH Corporation (California) using appropriate primers (Table 1).

Enzyme evolution. Error-prone PCR was used for in vitro evolution. The chrR gene was used as the template. (Unless indicated otherwise, the designations chrR and ChrR refer to the *E. coli* gene and protein, respectively.) Random mutations were introduced into this gene by error-prone PCR using a GeneMorph©II random mutagenesis kit (Stratagene Corporation, California). The forward and reverse chrR primers (Table 3) were used to amplify full-length hybrid products.

Screening for shuffled genes encoding high-activity chromate-reducing enzymes. The shuffled genes were ligated into the pET28a$^+$ plasmid and transformed into *E. coli* BL21

(DE3) to allow overexpression. Recombinants were selected on plates containing kanamycin (50 µg ml$^{-1}$). High-throughput screening of 6,000 recombinants was performed by inoculating colonies into individual wells of 96-well microtiter plates containing 200 µl LB medium and kanamycin. After growth to the stationary phase (overnight incubation; final AL$_{060}$, 1.0 to 1.5), 20-µl aliquots from each well were used to inoculate a second series of plates, using M9 minimal medium (Sigma Co.). Each well received the same initial inoculum density. The first set of plates was stored at −80° C. after addition of glycerol. Cells in the second inoculation series were allowed to grow to the mid-exponential phase and then exposed to 0.5 mM IPTG to induce expression of the recombinant gene. After overnight incubation, cells were lysed by addition of 30 µl BugBuster (Novagen Inc.), incubated for 20 min at room temperature, and centrifuged for 20 min at 3,000×g. One hundred microliters of the supernatant was mixed with 100 µl of a solution containing 500 µM potassium chromate or uranyl acetate, 2 mM NADH, 100 mM Tris-HCl (pH, 7), and double-distilled $H_2O$.

Protein purification. The most efficient enzymes for Cr(VI) reduction activity were purified on nickel columns using inocula obtained from the frozen plates. These enzymes were His tagged and therefore bound effectively to the nickel column. Protein concentrations were determined with a Bio-Rad Dc protein assay kit, using bovine serum albumin as a standard.

Site-directed mutagenesis. Appropriate primers (Table 1) were used for site-directed mutagenesis. These primers were designed to create single-codon mutations. The modified PCR products were cloned into pET28a$^+$ and transformed into *E. coli* BL21(DE3). The desired mutations were verified by sequencing.

Cr(VI) assays. Cr(VI) quantification, transformation of Cr(VI) by whole cells and cell extracts, the cell extract preparation, and chromate reductase assays were conducted as described previously (Ackerley, D F et al, *Appl. Environ. Microbiol.* 70:873-882; Park, C-H et al. Appl. Environ. Microbiol. 66:1788-1795). Kinetic measurements of enzyme activity were obtained (in quadruplicate) at pH 7 and 37° C. unless indicated otherwise.

U(VI) determination. U(VI) was quantified as described by Teixeira et al. (*J. Braz. Chem. Soc.* 10:519-522), as follows. Samples were collected after incubation for a specified time. A 120-µl sample was mixed with 130 µl of a reagent mixture containing a complexing solution consisting of 2-(2-thiazolyazo-p-cresol), Triton X-100 (0.15 M), N-cetyl-N,N,N-trimethyammonium bromide, and triethanolamine buffer (pH 6.5) in proportions of 5:1:1:1:5. This method depends on the binding of 2-(2-thiazolyazop-cresol) to U(VI), which is aided by Triton X-100 and N-cetyl-N,N,N-trimethyammonium bromide. After 15 min of color development, the A588 of samples were determined using a microplate reader (model EL311sx; BIO-TEK Inc.).

U(IV) determination. Uranium(IV) production was determined (G. J. Vazquez and A. J. Francis, unpublished) as follows. One hundred microliters of a freshly prepared reaction solution was added to a 100-µl sample. The reaction solution was prepared by mixing 3.5 ml of FeCl3 (1 mM, pH, 2), 0.75 ml of 1,10 phenanthroline (10 mM), and 0.75 ml of acetate buffer (1 M, pH, 4). One mole of uranyl(IV) reduces 2 mol of $Fe^{3+}$ to $Fe^{2+}$; the latter complexes with the 1,10-phenanthroline producing a red or orange color with absorbance at 510 nm. The U(IV) concentration was determined using a standard curve prepared with different concentrations of $Fe(NH_4)_2(SO_4)_2$.

ROS generation assay. The ROS generation assay was performed as previously described (Ackerley, D F et al, *Appl. Environ. Microbiol.* 70:873-882). The reaction mixtures contained 100 mM Tris-HCl (pH 7), 125 µM NADH, 250 µM $K_2CrO_4$, and 25 µg ml$^{-1}$ *E. coli* ChrR or 8 µg ml$^{-1}$ ChrR6. The two enzymes gave similar rates of NADH reduction at these concentrations. $H_2O_2$ formation was quantified using an Amplex-Red kit (Molecular Probes).

XANES analysis. X-ray absorption near-edge spectroscopy (XANES) was performed for chromate (0.5 to 1 mM) reduced by *E. coli* ChrR or ChrR6 at the Cr K edge (5,989 eV). The samples were suspended in Tris-HCl buffer (pH 6.8) containing 3 mM NADH. Samples were placed in a heat-sealed polyethylene bag and mounted on an Al sample holder having a cutout that was 2 mm high by 20 mm long by 1.5 mm thick, and the analysis was performed on beamline X10C at the National Synchrotron Light Source in the fluorescence mode using a 13-element Ge detector. The standards were Cr(VI) (potassium chromate; $K_2CrO_4$) and Cr(III) [chromium hydroxide; $Cr(OH)_3$]. Chromium hydroxide was prepared by dissolving $Cr(NO_3)_3 9H_2O$ in deionized water and slowly increasing the pH to 11 with sodium hydroxide. The resulting precipitate was allowed to settle overnight, washed twice with deionized water, and allowed to air dry.

Spectra (five scans per sample) were collected from 200 eV below to 300 eV above the absorption edge. Data in the XANES region were collected with 0.5-eV energy steps at 2.0 s per interval. Chromium metal foil was placed in the reference channel and was examined simultaneously with each sample to monitor shifts in the beamline energy. The XANES spectra were background subtracted and normalized to the edge jump using the suite of programs described by Ravel and Newville (*J. Synchrotron Radiat.* 12: 537-541). The first derivative of the absorption edge energy was used to determine the oxidation state.

Cell permeabilization. Cells were grown overnight, harvested by centrifugation (1,700×g, 10 min), and resuspended in 1.0 ml of 75 mM Tris-HCl (pH 7)—10 mM $MgSO_4$. Chloroform was added to a concentration of 1.5%, and the cell suspension was vortexed and incubated at 37° C. for 30 min.

Computer program. Sequences were aligned with Clustal W.

Results

Figure 1:
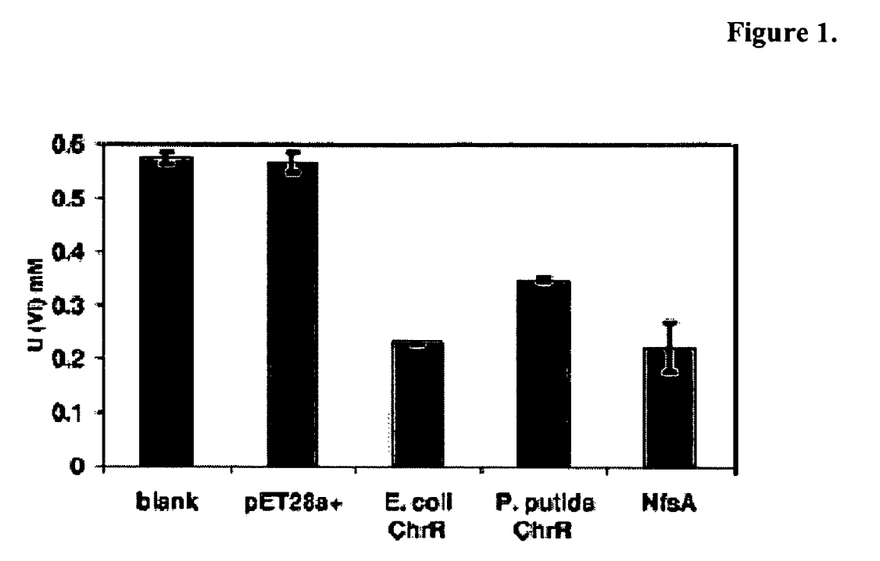
FIG. 1. Uranyl disappearance catalyzed by crude extracts of recombinant *E. coli* strains over-expressing different two-electron reducers. Reactions catalyzed in LB medium alone (blank) and by extracts of the strain transformed with the empty pET28+ vector were included as controls. The residual level of uranyl was determined after 6 h of incubation. The initial uranyl acetate concentration was 500 μM.

Obligate two-electron reducers can convert U(VI) to U(IV). Enzymes with the capacity to remediate multiple contaminants are highly desirable, and we focused on *E. coli* ChrR as a candidate because of its broad substrate range. We found, however, that crude extracts of *E. coli* cells transformed with the pET28a+ vector containing the *E. coli* chrR, *P. putida* chrR, or *E. coli* nfsA gene could all reduce U(VI) (FIG. 1); 90 to 95% of the U(VI) disappearing from the reaction mixture was detectable as U(IV). Appropriate controls established that enzymes encoded by these genes were responsible for the observed conversion. Thus, no activity was detected in reaction mixtures containing LB medium alone or in extracts of the strain containing the empty plasmid. The latter finding also shows that the normal levels of ChrR and NfsA present in *E coli* wild-type strain BL21 are not sufficient to catalyze this reaction at an appreciable rate. When overproduced, *E. coli* ChrR and NfsA were more active in this conversion than *P. putida* ChrR.

Figure 2:
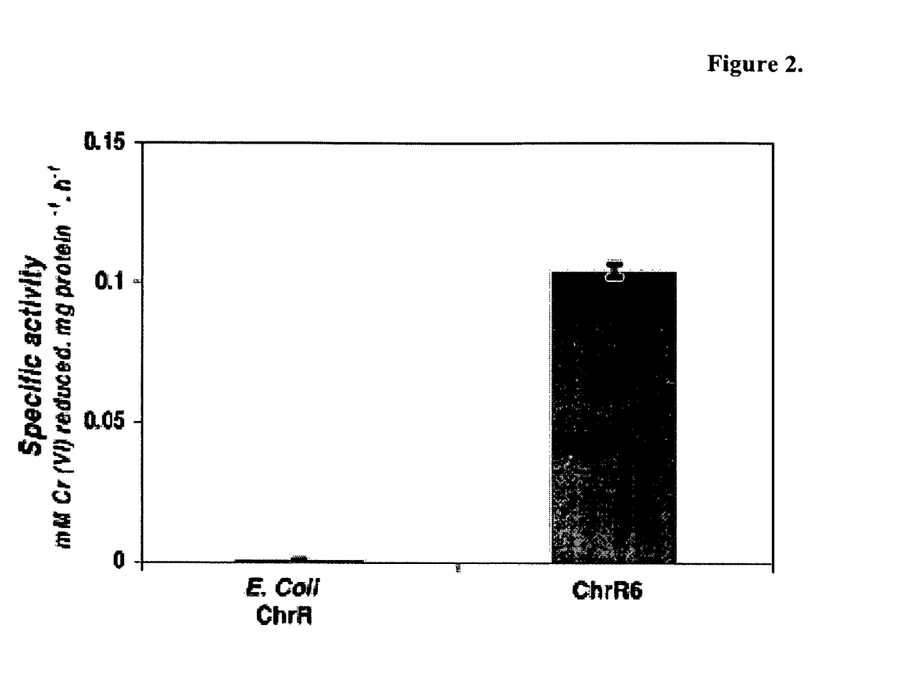
FIG. 2. Chromate reductase specific activities of crude extracts of recombinant *E. coli* cells over-expressing *E. coli* ChrR and ChrR6.

Evolved *E. coli* ChrR enzyme mutant exhibits improved Cr(VI)- and U(VI)-reducing activities. Using directed evolution employing error-prone PCR, we generated mutations in the *E. coli* chrR gene, and the products were screened to determine the chromate-reducing activities of the proteins that the genes encoded. Of the proteins showing improved activity, the mutant enzyme termed ChrR6 (formerly called Y6) was the most active; crude extracts of the strain overproducing this enzyme showed ca. 200-fold-greater chromate-reducing activity than the extracts of the strain overproducing the wild-type *E. coli* ChrR enzyme showed (FIG. 2). We also screened the mutant gene library directly for uranyl-reducing activity. Although the products of many mutant genes showed ;improved uranyl reductase activity, ChrR6 proved to be the most effective in this respect also.

Figure 3:
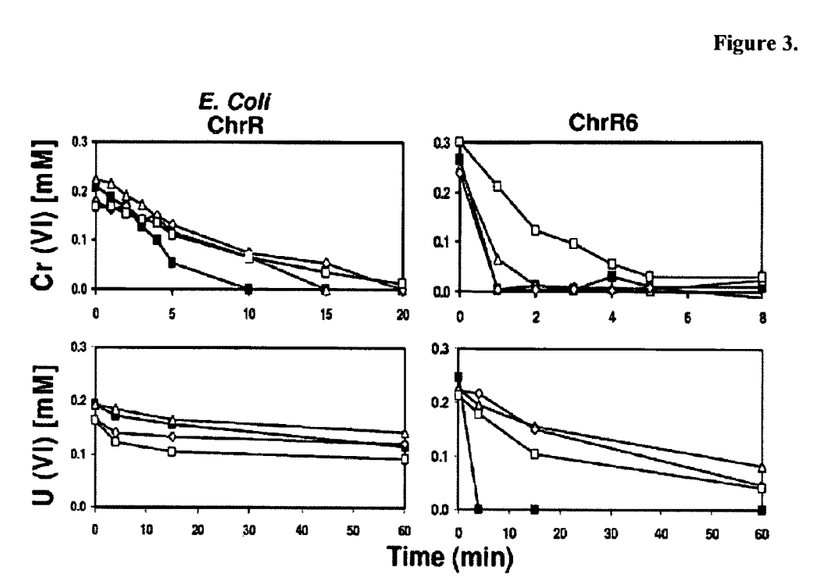
FIG. 3. Kinetics of Cr(VI) and U(VI) reduction at different pH values. Symbols: ■, pH 5; Δ, pH 7; ◊, pH 8; □, pH 9.5. The pH 5 preparation was obtained using acetic acid; the preparations at other pHs were obtained using Tris-HCl. The reactions were performed using 1-ml mixtures containing 250 μM potassium chromate or uranyl acetate, 2 mM NADH, 100 μg ml$^{-1}$ 1 enzyme, and the appropriate buffer. The experiment was conducted in triplicate; the differences between the mean values for the runs were less than 10%, as determined by analysis of covariance.

Further characterization of ChrR6 involved work with the pure protein. Compared to *E. coli* ChrR, ChrR6 exhibited markedly improved kinetics for chromate reduction. These kinetics included a 30-fold-higher $V_{max}$, a ninefold-lower $K_m$, and hence close to a 300-fold-higher $k_{cat}/K_m$ (Table 2), consistent with the crude extract results described above. For uranyl reduction, ChrR6 exhibited higher $V_{max}$, $k_{cat}$, and $k_{cat}/K_m$ values (Table 3). The $K_m$ of ChrR6 for uranyl was, however, higher than that of *E. coli* ChrR. The high rate of reduction of Cr(VI) or U(VI) was not noticeably affected in the presence of the two metal species simultaneously, indicating that ChrR6 was indeed capable of remediating both species in a mixed setting. It is noteworthy that in crude extracts, ChrR6 showed a much greater increase in activity than *E. coli* ChrR showed than when pure proteins of these enzymes were compared. The reason for this is not known but may be related to the ability of obligate two-electron reducing oxidoreductases to interact with membranes, suggesting that ChrR6 and *E. coli* ChrR may interact with membranes differently. ChrR6 exhibited a different pH activity profile than *E. coli* ChrR (FIG. 3). For example, at pH 5 the Cr(VI) and U(VI) reduction rates of ChrR6 were improved compared to those of *E. coli* ChrR.

TABLE 2

Kinetics of Cr(VI) reduction for wild-type *E. coli* ChrR and the evolved ChrR6 enzyme

| Enzyme | $V_{max}$ [nmol Cr(VI) mg protein$^{-1}$ min$^{-1}$] | $K_m$ (μM) | $k_{cat}$ (s$^{-1}$)$^a$ | $k_{cat}/K_m$ |
|---|---|---|---|---|
| *E. coli* ChrR | 295 ± 27 | 376 ± 14 | 30 ± 2 | 4.5 × 10$^4$ ± 3 × 10$^3$ |
| ChrR6 | 8,812 ± 611 | 41 ± 5 | 521 ± 18 | 1.3 × 10$^7$ ± 3 × 10$^5$ |

$^a$Based on a dimeric enzyme molecular mass of 50 kDa.

TABLE 3

Kinetics of U(VI) reduction for wild-type *E. coli* ChrR and the evolved ChrR6 enzyme

| Enzyme | $V_{max}$ [nmol U(VI) mg protein$^{-1}$ min$^{-1}$] | $K_m$ (μM) | $k_{cat}$ (s$^{-1}$)$^a$ | $k_{cat}/K_m$ |
|---|---|---|---|---|
| *E. coli* ChrR | 213 ± 17 | 108 ± 49 | 29 ± 11 | 1.6 × 10$^4$ ± 1.7 × 10$^3$ |
| ChrR6 | 2,511 ± 421 | 779 ± 40 | 331 ± 39 | 5 × 10$^5$ ± 2 × 10$_4$ |

$^a$Based on a dimeric enzyme molecular mass of 50 kDa (1).

Figure 4:
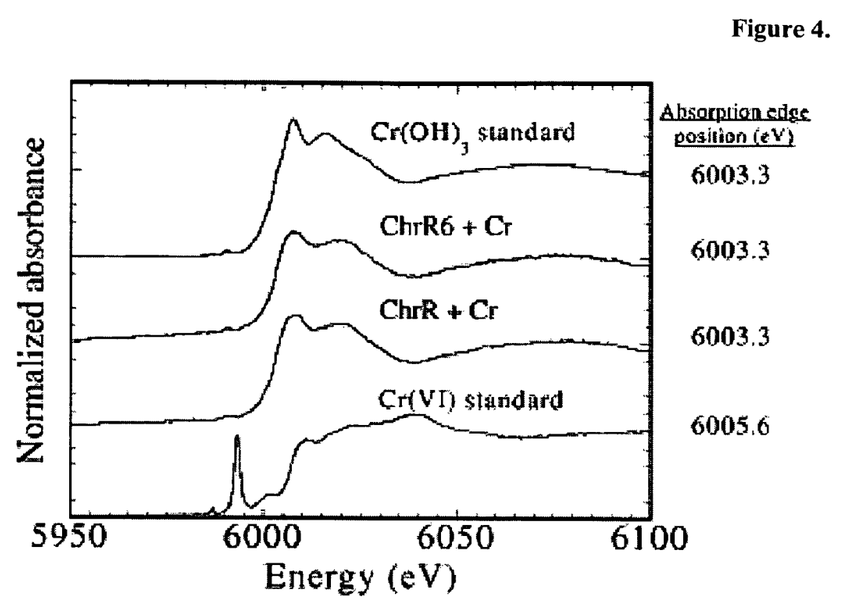
FIG. 4. Comparison of absorption edge positions at the Cr K edge for Cr(III) and Cr(VI) standards and chromate (indicated by Cr in the figure) samples reduced by the *E. coli* ChrR and ChrR6 enzymes.

End products of ChrR6 Cr(VI) and U(VI) reduction. To ascertain that ChrR6 retained the capacity of wild-type *E. coli* ChrR to quantitatively convert Cr(VI) to Cr(III), XANES analyses were performed. The XANES spectrum is sensitive to oxidation state changes in the target atom, and the absorption edge energy increases with a higher oxidation state. XANES spectra for the standards and samples are shown in FIG. 14. The first derivatives of the absorption edge energy for Cr(VI) and Cr(III) standards were at 6,005.6 and 6,003.3 eV, respectively. In addition, the Cr(VI) standard had a pre-edge peak at 5,993.3 eV. Upon complete reduction by the *E. coli* ChrR or ChrR6 enzyme, the deivative of the absorption edge energy was at 6,003.3 eV. This shift to an energy lower than the energy of the chromate standard was identical to the shift observed for the Cr(III) standard and confirmed that Cr(VI) was reduced to Cr(III). The absence of a pre-edge peak at 5,993.0 eV for the samples compared to the Cr(VI) spectrum also indicated that Cr(VI) was not present in the samples.

U(IV) generation by pure ChrR6 was determined chemically, as described above for measurements with crude extracts (FIG. 1). Again, more than 90% of the uranyl disappearing from the reaction mixture was recovered as U(IV).

ROS generation during chromate reduction by ChrR6. The XANES analysis, while showing that there was complete conversion of Cr(VI) to Cr(III) by ChrR6, did not rule out the possibility that there was transient generation of Cr(V). We previously established that Cr(V) is not generated during Cr(VI) reduction by *E. coli* ChrR. Some of the evidence for this conclusion is that only 25% of the NADH electrons consumed during *E. coli* ChrR-catalyzed chromate reduction were utilized in ROS generation. Thus, the four-electron-reduced *E. coli* ChrR dimer donated three electrons to chromate and one electron to dioxygen in a one-step reaction, avoiding Cr(V) generation and redox cycling. If Cr(V) had been generated and cycling had occurred, much more ROS would have been formed.

To test if ChrR6 was able to convert Cr(VI) to Cr(III) and U(VI) to U(IV) in one step, we compared the portions of the of NADH electrons utilized in ROS generation by *E. coli* ChrR and ChrR6 during chromate or uranyl reduction. As expected in light of our previous results, approximately 25% and 32% of the NADH electrons were consumed in generation of ROS during the *E. coli* ChrR-catalyzed reactions for Cr(VI) and U(VI), respectively. The corresponding values for ChrR6 were 12.5% and 16%, respectively. The data strongly suggest that like *E. coli* ChrR, ChrR6 is able to convert Cr(VI) to Cr(III) and U(VI) to U(IV) in one step and does not generate oxidative intermediates.

Amino acid sequences of the improved enzymes. Four substitutions occurred in the amino acid sequence of ChrR6 ($^{Val}120^{Ala}$, $^{Tyr}128^{Asn}$, $^{Thr}160^{Asn}$, and $^{Glu}175^{Leu}$) compared to the *E. coli* ChrR sequence. When each altered amino acid was individually changed to the original residue, only the $^{Asn}128^{Tyr}$ change diminished ChrR6 activity (Table 4). Furthermore, the single $^{Tyr}128^{Asn}$ substitution in the *E. coli* ChrR protein (mutant protein called ChrR21) led to even greater increases in the Cr(VI) and U(VI) reduction rates compared to the rates for ChrR6 (147,619±46,576 and 6,007±226 nmol mg protein$^{-1}$ min$^{-1}$, respectively). In recent work employing a successful first application of a novel approach, which requires no structural knowledge, and is based on a probabilistic model for protein optimization described by Nov and Wein (2005), we succeeded in expediting the enzyme improvement process. After screening only 11 mutants of the enzyme, we isolated a mutant whose activity is >1,500 and 20 times greater than that of the wild type ChrR for chromate and uranyl reduction rates, respectively, This mutant, ChrR30 has the following modifications $^{Tyr}128^{Asn}$, $^{Gly}150^{Ser}$ and $^{Asn}154^{Thr}$.

TABLE 4

Site-directed mutagenesis variants of ChrR6 and their specific Cr(VI) reduction rates

| Enzyme | Sp act [nmol Cr(VI) mg protein$^{-1}$ min$^{-1}$] |
|---|---|
| E. coli ChrR | 295 ± 27 |
| ChrR6 | 8,812 ± 611 |
| Ala120Val | 9,200 ± 545 |
| Asn128Tyr | 200 ± 53 |
| Asn160Thr | 7,836 ± 321 |
| Leu175Glu | 10,205 ± 487 |

Figure 5:
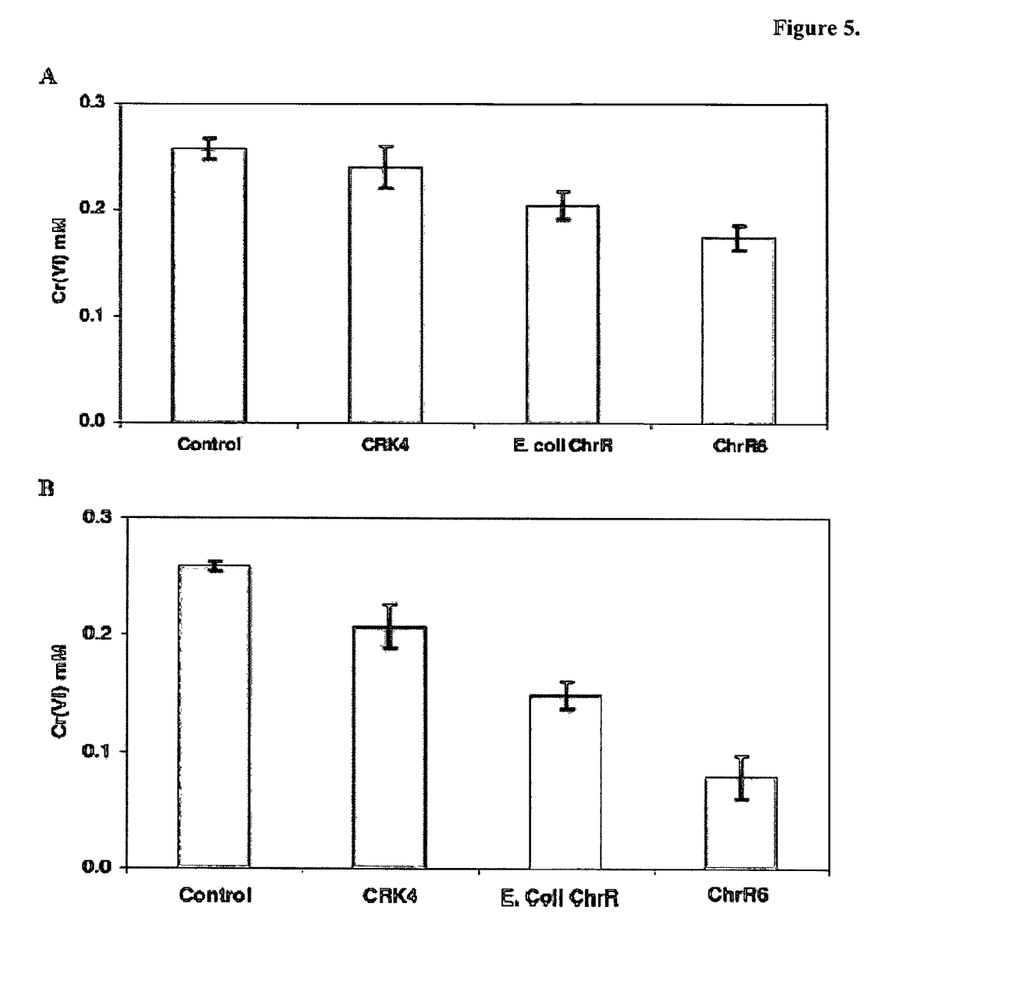
FIGS. 5A-5B. (A) Cr(VI) disappearance caused by whole cells of *P. putida* CRK4 strains transformed with the empty plasmid or a plasmid containing the *E. coli* ChrR or ChrR6 gene. The control data are the data for chromate disappearance in LB medium alone. (B) Chromate disappearance caused by crude extracts of the strains described above. See Materials and Methods for further details.
Figure 6:
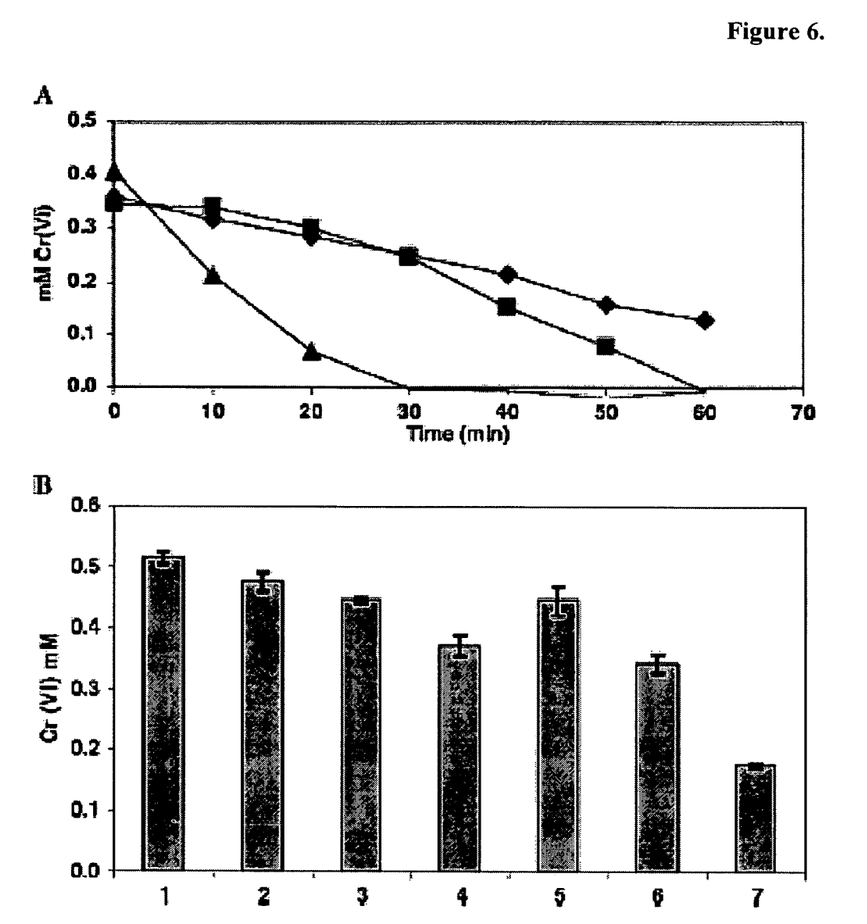
FIGS. 6A-6B. (A) Cr(VI) disappearance caused by whole cells of chloroform-permeabilized *P. putida* CRK4 strains transformed with the empty plasmid or a plasmid containing the *E. coli* ChrR or ChrR6 gene. The initial concentration of potassium chromate was 500 μM. The experiment was conducted in triplicate; the differences between the mean values for the runs were less than 10%, as determined by analysis of covariance. Symbols: ♦, CRK4; ■, CRK4 over-expressing *E. coli* ChrR; ▲, CRK4 over-expressing ChrR6. (B) Cr(VI) disappearance caused by whole cells of *E. coli* MC4100 and NR698 transformed with the empty plasmid or a plasmid containing the *E. coli* ChrR or ChrR6 gene. The numbers on the abscissa indicate the following: 1, control (LB medium alone); 2, MC4100/pET; 3, MC4100 with *E. coli* ChrR; 4, MC4100 with ChrR6; 5, NR698/pET; 6, NR698 with *E. coli* ChrR; 7, NR698 with ChrR6.

Effect of ChrR6 expression on chromate reduction by whole cells. As our long-term objective is to generate bacterial strains capable of superior remediation in situ, we tested the efficacy of ChrR6 in P. putida, which is an indigenous organism at polluted sites and is thus a suitable candidate for progress toward this end. The E. coli ChrR- and ChrR6-encoding genes (E. coli chrR and chrR6, respectively) were cloned in the broad-range vector pMMB67EH, and the recombinant plasmids were introduced into P. putida KT2440 mutant CRK4. This strain lacks the chrR gene that encodes the P. putida ChrR protein and has decreased chromate-reducing ability compared to the wild-type strain. Neither the E. coli ChrR-expressing recombinant strain nor the E. coli ChrR6-expressing recombinant strain exhibited any significant improvement in chromate reduction capacity (FIG. 5A). However, cell extracts of the E. coli chrR-transformed strain did exhibit improved chromate reductase activity, and further improvement was seen in extracts of cells expressing the ChrR6 enzyme (FIG. 5B). The results indicate that the E. coli chrR gene and its evolved chrR6 version were expressed in P. putida and suggest that the permeability barrier to chromate masked the enhanced cellular chromate reductase activity of the transformed strains. To further test the involvement of the transport barrier, the capacities of the transformed cells to reduce chromate were determined following permeabilization of the cells by chloroform treatment. The recombinant strains expressing E. coli ChrR or ChrR6 showed greater reductase activity than CRK4, and the ChrR6-expressing strain showed the highest activity (FIG. 6A).

To further establish that the permeability barrier to chromate may be a limiting factor in chromate reduction in bacteria, we took advantage of the availability of E. coli mutant NR698, whose outer membrane permeability is impaired. The plasmids mentioned above were transformed in this mutant and the isogenic wild-type strain, MC4100, and the chromate reductase activities of the two strains were compared. Again, as was observed with the intact P. putida strain, there was little difference between the reduction capacity of the MC4100 parent strain and the reduction capacities of the E. coli ChrR- and ChrR6-expressing transformants. However, with the permeability barrier breached in the case of strain NR698, a clear improvement in chromate reduction was evident in the ChrR6-expressing strain (FIG. 6B). Furthermore, chloroform-treated MC4100 and NR698 strains (not expressing or overexpressing E. coli ChrR or ChrR6) exhibited even greater reduction rates. However, not all bacteria were impermeant. Thus, when strain SL 7838 of Salmonella enterica serovar Typhimurium was transformed with a plasmid bearing the chrR6 gene, the chromate reduction activity exhibited by whole cells was high compared to that of the E. coli chrR-transformed strain even without cell permeabilization.

Figure 7:
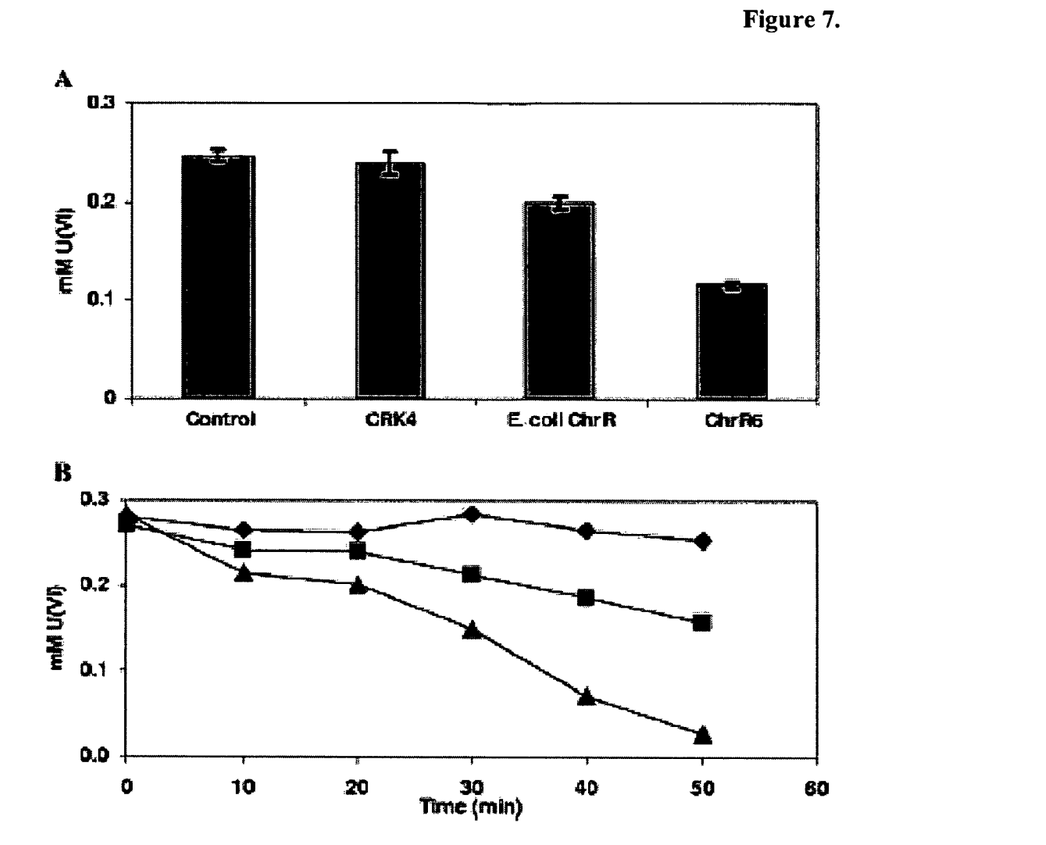
FIGS. 7A-7B. (A) U(VI) disappearance caused by whole cells of *P. putida* CRK4 strains transformed with the empty plasmid or a plasmid containing the *E. coli* chrR or chrR6 gene. The control data are for uranyl disappearance in LB medium alone. Symbols: ♦, CRK4; ■, CRK4 over-expressing *E. coli* ChrR; ▲, CRK4 over-expressing ChrR6. (B) Uranyl disappearance caused by chloroform-treated cells of the strains described above. The experiment was conducted in triplicate. The differences between the means for the runs were less than 5%, as determined by analysis of covariance.

Effect of ChrR6 expression on uranyl reduction by whole cells. Nonpermeabilized P. putida CRK4 cells showed marginally greater uranyl reduction when they were transformed with the chrR6 gene than when they were transformed with the E. coli chrR gene (FIG. 7A). Again, however, the difference was more pronounced with permeabilized cells (FIG. 7B), showing that the full potential of ChrR6 for uranyl reduction is also masked by the cell permeability barrier.

We show here that the improved version of E. coli ChrR, the ChrR6 enzyme, does indeed have the potential to confer on bacteria the capacity for superior intracellular reduction of two serious pollutants, chromate and uranyl. An additional important reason for working with these enzymes is that they are NAD(P)H oxidoreductases and are active under both aerobic and anaerobic conditions as long as the cofactors are available. Thus, expression of ChrR6 in anaerobic dissimilatory metal reducers, such as species of Shewanella, Desulfovibrio, and several other nitrate reducers, can enhance their metal bioremediation efficiency as well.

ChrR6 showed superior kinetics for chromate reduction in all respects tested, including a 30-fold-improved $V_{max}$, a severalfold-lower $K_m$, and $k_{cat}/K_m$ values that were increased by orders of magnitude. It retained the capacity to quantitatively convert Cr(VI) to Cr(III), and as it generated very little ROS during this conversion, it seems reasonable to conclude that it did so in one step, avoiding the generation of Cr(V), which is a major source of toxicity to bacteria during chromate reduction.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for reduction of Chromium (Cr)(VI) to Chromium (Cr) (III) or Uranium (U)(VI) to Uranium (U)(IV), the method comprising:
   contacting said Chromium (Cr)(VI) or Uranium (U)(VI) with an effective amount of an *E. Coil* nitroreductase enzyme (ChrR) polypeptide, wherein said *E. coli* nitroreductase enzyme (ChrR) polypeptide comprises at least one amino acid alteration at amino acid residue 128, 150 or 154 relative to the wild-type enzyme set forth in SEQ ID NO:1, wherein said alteration has enhanced enzyme kinetics for reduction of Chromium (Cr)(VI) or Uranium (U)(VI) relative to the wild-type *E. coli* nitroreductase enzyme having the amino acid sequence of SEQ ID NO:1.

2. The method according to claim 1, wherein said ChrR enzyme comprises a glutamine or asparagine at the position corresponding to residue 128 of SEQ ID NO:1.

3. The method according to claim 2, wherein said ChrR enzyme comprises serine, threonine or cysteine at the position corresponding to residue 150 of SEQ ID NO:1.

4. The method according to claim 2, wherein said ChrR enzyme comprises serine, threonine or cysteine at the position corresponding to residue 154 of SEQ ID NO:1.

5. The method according to claim 1, wherein said ChrR polypeptide is expressed by a microbial host comprising a non-native ChrR coding sequence.

6. The method according to claim 5, wherein said microbial host is a nitrate-reducing bacterium.

7. The method according to claim 5, wherein said microbial host is species of *Enterobacteriaceae*.

8. The method according to claim 5, wherein said Cr(VI) or U(VI) is a contaminant at a site for bioremediation.

9. The method according to claim 8, wherein said ChrR enzyme comprises a glutamine or asparagine at the position corresponding to residue 128 of SEQ ID NO:1.

10. The method according to claim 8, wherein said ChrR enzyme comprises serine, threonine or cysteine at the position corresponding to residue 150 of SEQ ID NO:1.

11. The method according to claim 8, wherein said ChrR enzyme comprises serine, threonine or cysteine at the position corresponding to residue 154 of SEQ ID NO:1.

* * * * *

SEQUENCE LISTING

```
<160> NUMBER OF SEQ ID NOS: 1

<210> SEQ ID NO 1
<211> LENGTH: 188
<212> TYPE: PRT
<213> ORGANISM: E. coli

<400> SEQUENCE: 1

Met Ser Glu Lys Leu Gln Val Val Thr Leu Leu Gly Ser Leu Arg Lys
1               5                   10                  15
```

-continued

```
Gly Ser Phe Asn Gly Met Val Ala Arg Thr Leu Pro Lys Ile Ala Pro
            20                  25                  30

Ala Ser Met Glu Val Asn Ala Leu Pro Ser Ile Ala Asp Ile Pro Leu
        35                  40                  45

Tyr Asp Ala Asp Val Gln Gln Glu Asp Gly Phe Pro Ala Thr Val Glu
    50                  55                  60

Ala Leu Ala Glu Gln Ile Arg Gln Ala Asp Gly Val Val Ile Val Thr
65                      70                  75                  80

Pro Glu Tyr Asn Tyr Ser Val Pro Gly Gly Leu Lys Asn Ala Ile Asp
                85                  90                  95

Trp Leu Ser Arg Leu Pro Asp Gln Pro Leu Ala Gly Lys Pro Val Leu
                100                 105                 110

Ile Gln Thr Ser Ser Met Gly Val Ile Gly Gly Ala Arg Cys Gln Tyr
        115                 120                 125

His Leu Arg Gln Ile Leu Val Phe Leu Asp Ala Met Val Met Asn Lys
        130                 135                 140

Pro Glu Phe Met Gly Gly Val Ile Gln Asn Lys Val Asp Pro Gln Thr
145                 150                 155                 160

Gly Glu Val Ile Asp Gln Ser Thr Leu Asp His Leu Thr Gly Gln Leu
                165                 170                 175

Thr Ala Phe Gly Glu Phe Ile Gln Arg Val Lys Ile
            180                 185
```